March 22, 1927.
H. W. HEM
WEIGHING SCALE
Filed April 8, 1925
1,622,113
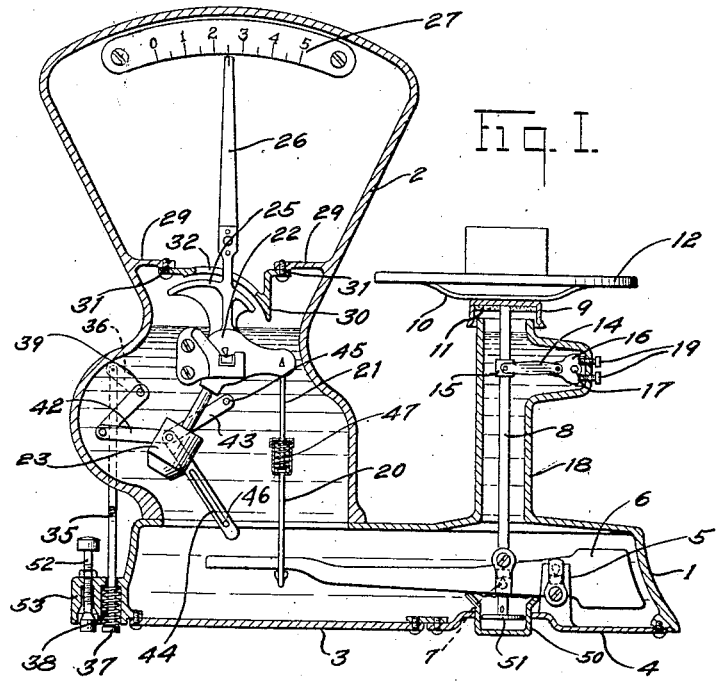
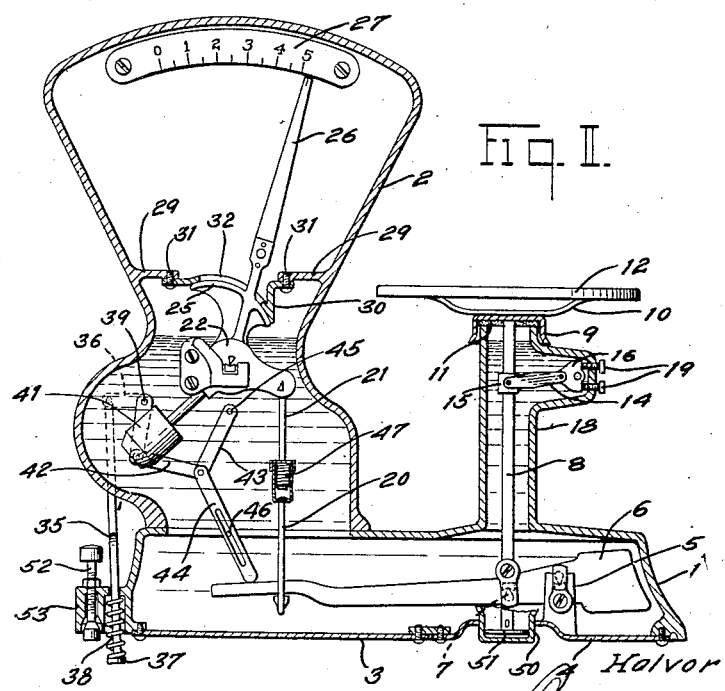
Inventor
Halvor W. Hem.
By C. M. Marshall
Attorney Patented Mar. 22, 1927.

1,622,113

UNITED STATES PATENT OFFICE.

HALVOR W. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed April 8, 1925. Serial No. 21,464.

This invention relates to weighing scales, and more particularly to locking devices for scales of the counter type.

One of the principal difficulties encountered in the manufacture of weighing scales is the provision of an adequate and reliable locking means for the weighing mechanism.

One of the salient objects of this invention is the provision of automatic means for restraining relative movements of the weighing mechanism whenever the scale is lifted from its support.

Another object is the provision of a scale having substantially all of its moving parts immersed in a protective fluid, as, for example, oil, the scale being provided with mechanism whereby the openings in the scale housing through which the indicator hand and platform supporting member operate are adapted to be closed by fluid tight means simultaneously with the engagement of the weighing mechanism by suitable locking mechanism whenever the scale is lifted from its support.

Another object is the provision of a weighing scale in which the weighing mechanism is automatically locked against relative movement when the scale is removed from a support and, when repositioned upon a support, the weighing mechanism is automatically released and allowed to swing per se to its initial or zero position.

A further object is the provision of a locking device for a weighing scale mechanism which acts automatically to lock the weighing mechanism against relative movement whenever the scale is lifted from its support, the position of the weighing mechanism at the instant the scale is moved being immaterial as having any effect upon the locking device.

Still another object is the provision of a locking device for a weighing mechanism which is reliable and efficient in its operation and inexpensive to manufacture.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a longitudinal sectional elevational view through the scale of my invention; and Figure II is a view similar to Figure I showing the various elements of the mechanism in a locked position, as when the scale is removed from its support.

Referring to the drawings, I have shown the various elements of my invention incorporated in a scale of the so-called fan type, but it is to be understood that my invention may be embodied in any type of weighing mechanism, and I contemplate its use wherever it may be found to be applicable.

The scale with which I have illustrated my invention consists of a hollow base 1 upon one end of which is mounted an upright housing 2, the upper portion of which is substantially fan-shaped. An opening in the base is adapted to be enclosed by means of suitable plates or enclosures 3 and 4, the plate 4 being provided with upwardly projecting lugs 5 upon which is fulcrumed a lever 6. The lever 6 is provided with load pivots 7 supporting a member 8, the upper extremity of which is secured in any suitable manner to an inverted cup-like member 9 and a spider 10, and superimposed upon the spider 10 is a commodity-receiver or platform 12. A checking arrangement for maintaining the commodity-receiver level throughout weighing movements is provided consisting of a link 14 pivoted at its ends respectively to a member 15 fixed to the spider stem 8 and to a bracket 16 which is adjustably mounted upon a pintle 17 fixed in an upwardly projecting portion 18 of the base 1. A pair of screws 19 is threaded into the wall of the portion 18 of the base and engages the bracket 16 on either side of its pivotal point, and by manipulation of the screws 19 the link 14 may be adjusted so that the platform 12 will remain in a vertical position throughout weighing movements.

The nose end of the lever 6 is operatively connected by means of rods or links 20 and 21 to a load-counterbalancing element comprising a center structure 22 and a pendulum 23, the latter being adapted to swing outwardly to counterbalance a load upon the platform 12. Projecting upwardly from the center structure 22 of the load-counterbalancing element is a sector 25, and fixed to the sector is an indicating hand 26 adapted to co-operate with a suitably graduated chart 27 to indicate the weight of the load. The inner walls of the housing 2 are provided with webs 29 to which is secured a member 30 by means of screws 31. An opening 32 in the member 30 provides ample clearance for the movement of the indicator hand 26 within the scope of the chart 27. The lower curved surface of the member 30 and the curved surface of the sector 25 are of such contour that when the pendulum is moved to the position shown in Figure II these curved surfaces engage each other in a close fitting joint.

From the foregoing description it will be apparent that the indicator, sector and pendulum are normally free to move within the scope of the chart 27. When a load is placed upon the platform 12 the latter is caused to move downwardly, exerting a force upon the lever 6 which is transmitted through the links 20 and 21 to the pendulum 23, moving the pendulum outwardly until the load upon the platform is balanced, the weight of the load being indicated upon the chart 27.

The mechanism employed for automatically locking the weighing mechanism against relative movement when the scale is lifted from its support will now be described. The end of the base 1 adjacent the housing 2 is provided with an opening adapted to receive a rod 35, the lower end of the rod being provided with a flange 37, the purpose of which is to prevent dislodgment of an expansive coil spring 38 surrounding the rod 35 and interposed between the base and the flange. The upper end of the rod 35 is pivotally connected to one end of an arm 36 positioned exteriorly of the housing 2, the other end being fixed to a transversely extending shaft 39 suitably journaled in fluid tight bearings in the walls of the housing 2. One end of an arm 41 located within the housing is fixedly secured to the shaft 39, the other end being pivotally connected to a link 42. The link 42 is connected to a pair of links 43 and 44, the link 43 being connected to the housing 2, as at 45, the link 44 having an elongated slot adapted to loosely receive a pin 46, the latter fixed in the base 1 of the scale.

When the scale is positioned on the merchant's counter or other support the rod 35 and linkage connected thereto assume the position shown in Figure I. However, when the scale is removed from the support, the parts are shifted under the influence of the spring 38 to the position shown in Figure II, the link 44 exerting a downward force on the nose end of the lever 6, and a consequent force on the links 20 and 21 causes the pendulum and indicator hand to swing to the position illustrated, thus effecting a closure of the opening 32. A coil spring 47 interposed between the links 20 and 21 resiliently secures the pendulum and associated mechanism in locked position. Downward movement of the lever 6 also brings the gasket 11 fixed in the cup-like member 9 into seating contact with the rim of the column 18, thereby closing the opening through which the platform supporting stem operates.

It will be obvious that if the scale is shifted from a fixed position the various parts of the weighing mechanism will be automatically locked against relative movement and the openings in the housing closed so that tipping of the scale would not result in the oil being spilled.

Suitable damping means of any type may be employed, that shown consisting of a dash pot 50 filled with oil within which a plunger 51 connected to the lever 6 operates. A screw 52 threaded into a projecting lug 53 may be manipulated to bring the scale to a level position upon the counter or support.

From the foregoing it will be apparent that when the scale is properly positioned upon a merchant's counter or other suitable support the flange 37 engaging the support causes the spring 38 to be compressed and the linkage to be moved to the position illustrated in Figure I out of engagement with the weighing mechanism. However, should the scale be removed from the support for any reason the linkage system will be shifted under the influence of the expansive force of the pre-compressed spring 38 to the position illustrated in Figure II, thus effectively locking the weighing mechanism in the manner hereinbefore described.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a housing having openings, weighing mechanism in said housing, a fluid in said housing and surrounding said weighing mechanism, and means for automatically closing said openings when said housing is shifted from a support.

2. In a device of the class described, in combination, a housing having an opening therein, a fluid in said housing, weighing mechanism housed in said container and operating in said fluid, and means for simultaneously locking said mechanism against relative movement and closing said opening when the housing is shifted from a fixed position.

3. In a device of the class described, in combination, a housing having an opening therein, a fluid in said housing, weighing mechanism supported in said housing and normally operating in said fluid, and means for simultaneously locking said weighing mechanism against relative movement and closing said opening when the housing is removed from its support.

4. In a device of the class described, in combination, a base housing, lever mechanism supported in said housing, an upright housing on said base housing, load-counterbalancing mechanism supported in said upright housing, and means operative when the scale is lifted from a support to restrain said lever and load-counterbalancing mechanism against movement.

5. In a weighing scale, in combination, a housing, lever and load-counterbalancing mechanism supported in said housing, a fluid surrounding said mechanism, and means for simultaneously locking said mechanism against relative movement and preventing the spilling of said liquid when the scale is moved from place to place.

6. In a device of the class described, in combination, a base housing, weighing mechanism supported upon said base housing, locking mechanism for said weighing mechanism including a downwardly projecting member, said locking mechanism held out of engagement with said weighing mechanism by engagement of said member with a plane surface upon which said base housing rests, and means whereby said locking means automatically engages said weighing mechanism when the housing is lifted from its support.

7. In a device of the class described, in combination, a base housing, weighing mechanism including lever mechanism supported upon said base housing, locking means for said lever mechanism including a downwardly projecting member, said member normally engaging a plane surface upon which the base housing is supported to prevent the engagement of said lever mechanism by said locking means, and means whereby said lever mechanism is engaged by said locking means and held against relative movement when the housing is lifted from the supporting surface.

8. In a weighing scale, in combination, weighing mechanism including load-counterbalancing mechanism, locking means for said load-counterbalancing mechanism including a downwardly projecting member, said member being adapted to engage a plane surface upon which the scale is supported to normally prevent the locking means from engaging said load-counterbalancing mechanism, and means including a resilient member whereby said locking means automatically engages said load-counterbalancing mechanism to restrain the latter against movement when the scale is lifted from the supporting surface.

9. In a weighing scale, in combination, weighing mechanism, locking mechanism including a system of linkage adapted to automatically engage said weighing mechanism when the scale is removed from a supporting surface, and means adapted to engage the supporting surface when the scale is repositioned thereon to effect a release of said locking means.

10. In a weighing scale, in combination, weighing mechanism, locking mechanism including a system of linkage, a downwardly projecting member connected to said linkage, said member adapted to engage a supporting surface, upon which the scale is adapted to rest, to prevent the locking mechanism from engaging the weighing mechanism, and resilient means acting upon said downwardly projecting member when the scale is lifted from its support to cause the locking mechanism to automatically engage the weighing mechanism and restrain the latter against relative movement.

HALVOR W. HEM.